United States Patent [19]

Eouzan et al.

[11] Patent Number: 5,231,481
[45] Date of Patent: Jul. 27, 1993

[54] PROJECTION DISPLAY DEVICE WITH NEGATIVE FEEDBACK LOOP TO CORRECT ALL THE FAULTS OF THE PROJECTED IMAGE

[75] Inventors: Jean-Yves Eouzan, Fouillard; Tristan de Couasnon, Rennes; Yvon Fouche, Malabry, all of France

[73] Assignee: Thomson-CSF, Puteaux, France

[21] Appl. No.: 673,081

[22] Filed: Mar. 21, 1991

[30] Foreign Application Priority Data

Mar. 23, 1990 [FR] France ................................ 90 03745

[51] Int. Cl.$^5$ .............................................. H04N 9/31
[52] U.S. Cl. ......................................... 358/60; 358/64; 358/10
[58] Field of Search ................ 358/60, 61, 64, 10, 358/139; 315/368, 389, 387

[56] References Cited

U.S. PATENT DOCUMENTS

| | | | |
|---|---|---|---|
| 4,485,394 | 11/1984 | Ghaem-Maghami et al. | |
| 4,672,275 | 6/1987 | Ando | 358/60 |
| 4,868,668 | 9/1989 | Tavernetti | 358/60 |
| 4,999,703 | 3/1991 | Henderson | 358/60 |
| 5,020,116 | 5/1991 | Macaulay | 358/60 |
| 5,036,251 | 7/1991 | Lee | 358/10 |
| 5,049,791 | 9/1991 | Kawakami | 358/10 |

FOREIGN PATENT DOCUMENTS

| | | |
|---|---|---|
| 0280302 | 8/1988 | European Pat. Off. |
| 0404700 | 12/1990 | European Pat. Off. |
| 61-101190 | 5/1986 | Japan |
| 1-255391 | 12/1989 | Japan |

OTHER PUBLICATIONS

Patent Abstracts of Japan, vol. 12, No. 280 (P-739) [3127], Aug. 2, 1988; & JP-A-63 61 302.
Patent Abstracts of Japan, vol. 6, No. 60(E-102) [938], Apr. 17, 1982; & JP-A-56 169 984.
Patent Abstracts of Japan, vol. 12, No. 118 (E-600) [2965], Apr. 13, 1988; & JP-A-62 247 691.
Patent Abstracts of Japan, vol. 12, No. 265 (E-637) [3112], Jul. 23, 1988; & JP-A-63 48 987.
Patent Abstracts of Japan, vol. 12, No. 256 (E-635) [3103], Jul. 19, 1988; & JP-A-63 43 485.

*Primary Examiner*—Edward L. Coles, Sr.
*Assistant Examiner*—Kim Yen Vu
*Attorney, Agent, or Firm*—Oblon, Spivak, McClelland, Maier & Neustadt

[57] ABSTRACT

A projection display device is provided with a negative feedback chain designed to correct all the faults of the projected image, said faults resulting as much from the projection tubes and from their optic systems (geometrical or focusing faults) as from the differences between these tubes (faults in convergence, colorimetry or uniformity of brilliance). The negative feedback chain comprises a test chart generating means, a means to retake the entire projected image and means for the comparision of the signals coming from the test image and from the retaken image. Correction signals are prepared on the basis of this comparison and are applied to the different control circuits defining the projection characteristics. The disclosed device can also be used for the real-time follow-up of the adjustments obtained in a phase prior to the projection of the sequence of useful video images. The invention can be applied notably to video projectors, retro-projection display devices or beam-index tubes.

10 Claims, 4 Drawing Sheets

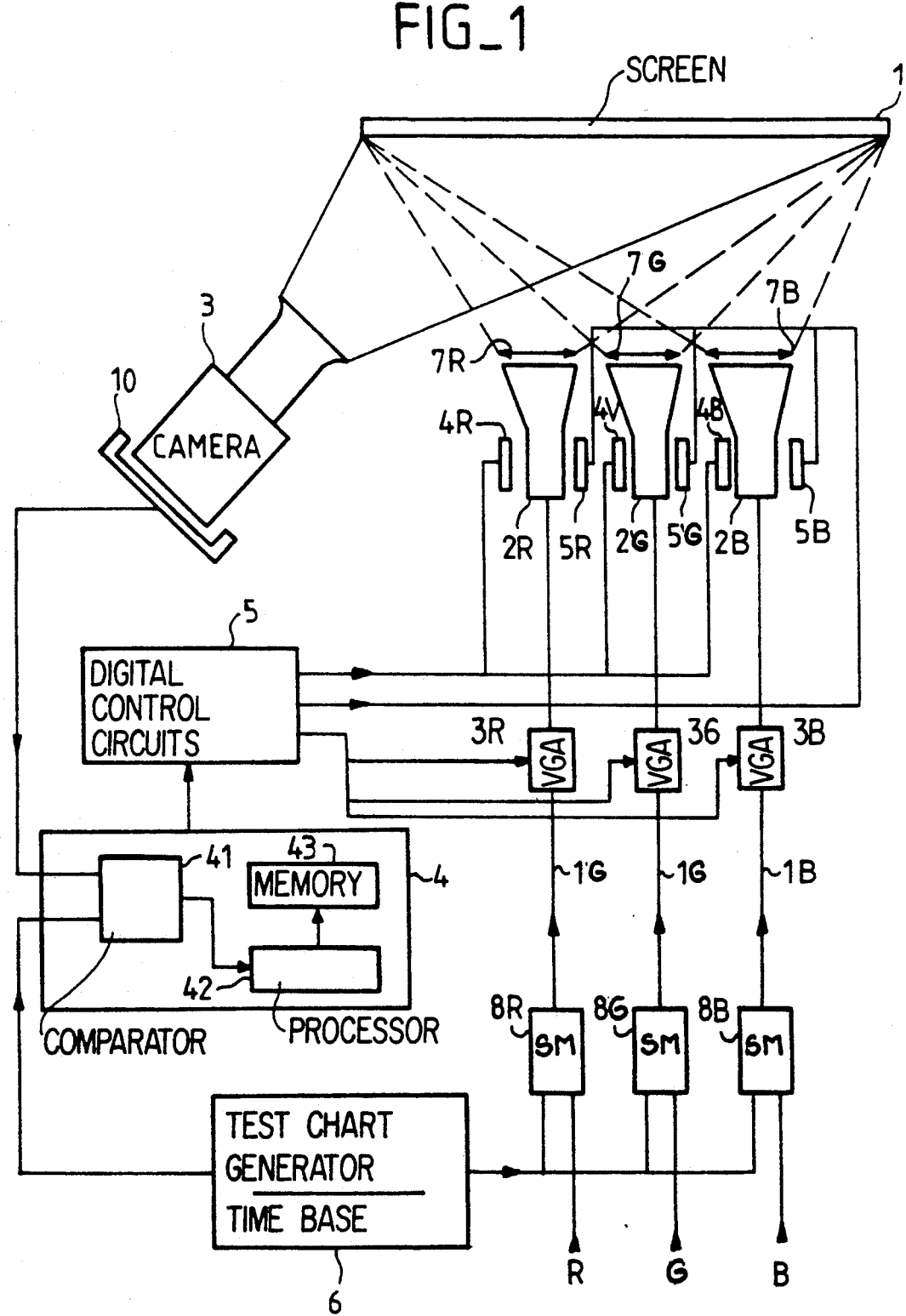
FIG_1

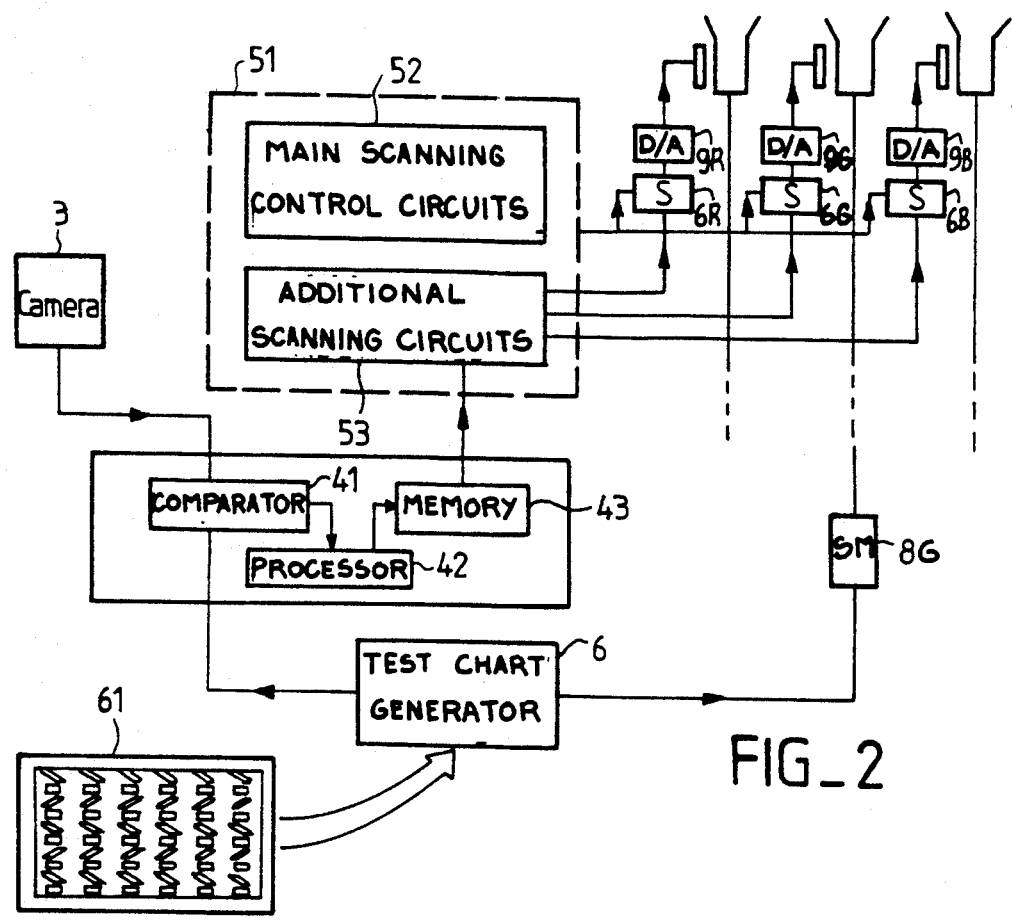
FIG_2
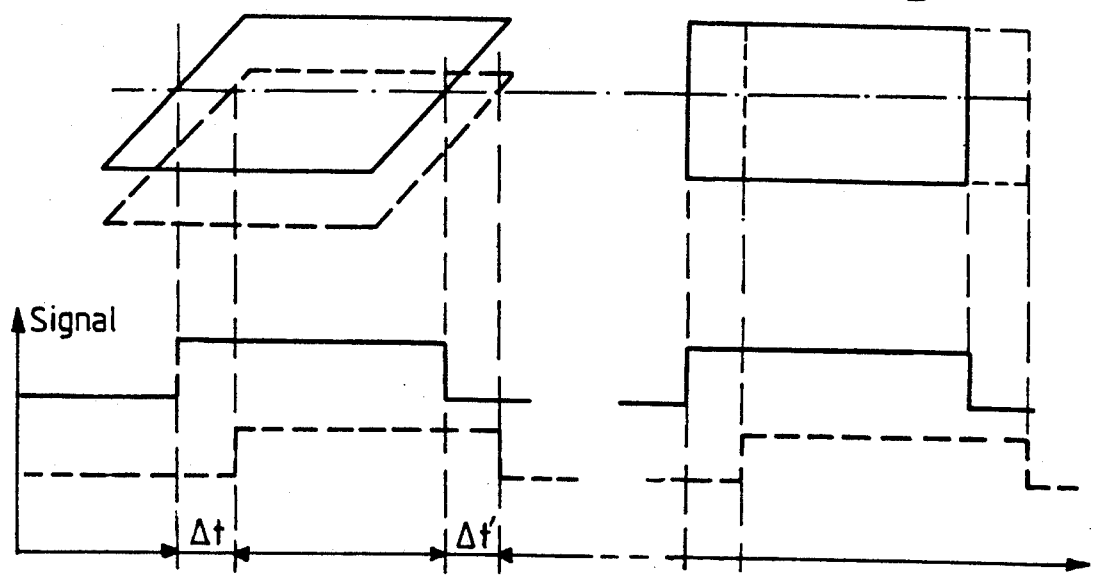
FIG_3-a    FIG_3-b

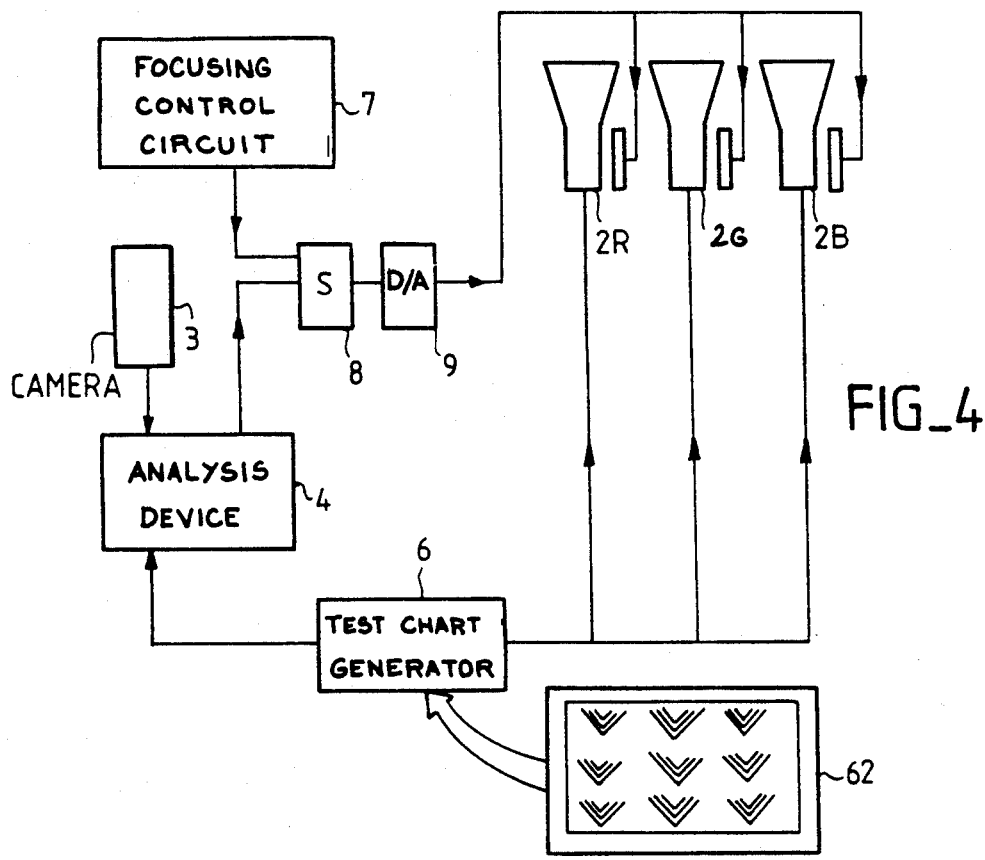
FIG_4
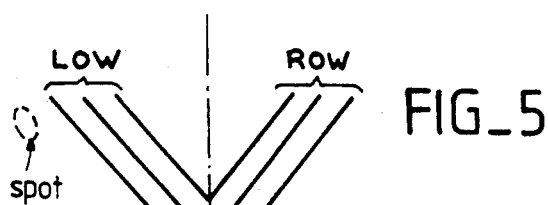
FIG_5
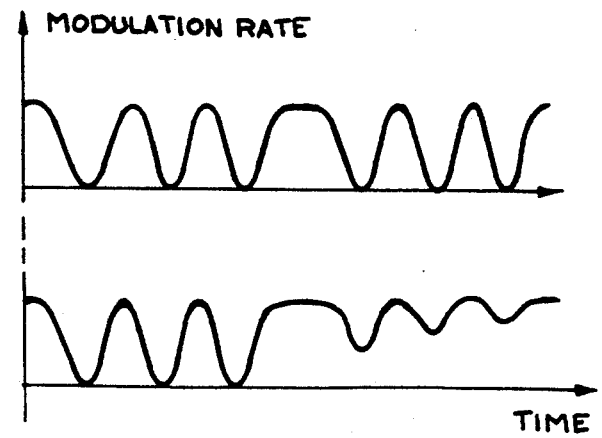
FIG_6-a
FIG_6-b

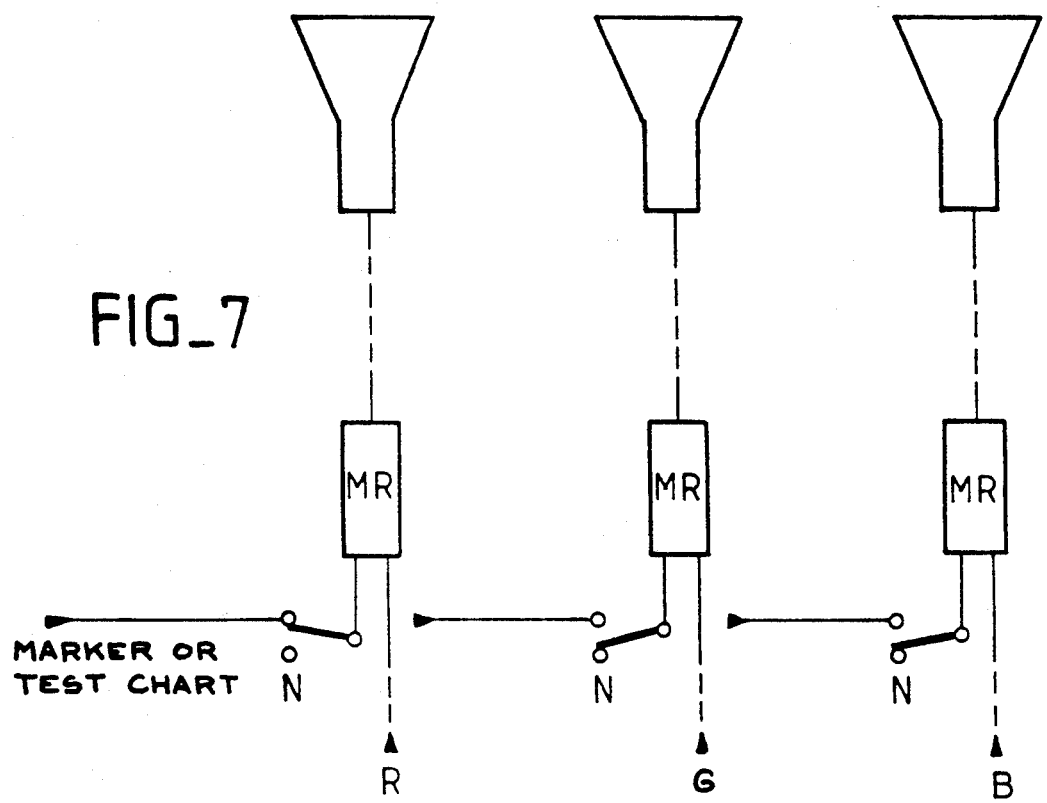
FIG_7
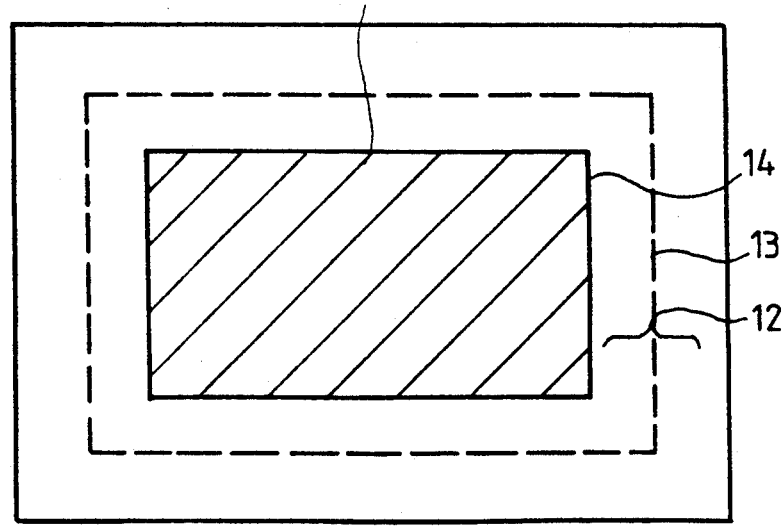
FIG_8

PROJECTION DISPLAY DEVICE WITH NEGATIVE FEEDBACK LOOP TO CORRECT ALL THE FAULTS OF THE PROJECTED IMAGE

BACKGROUND OF THE INVENTION

1. Field of the Invention

The present invention relates to the field of the display of images and, in particular, to projection display devices using a video projector with several projection tubes (at least one group of three tubes for the three components, red, green and blue).

Projection display devices give images having faults of geometry, convergence, focusing, colorimetry and uniformity resulting as much from defects in the projection tubes themselves and their optic systems as from the differences in the characteristics of these tubes, leading to a poor superimposition of the colors. These faults need to be corrected in order to obtain a quality image at every point of the surface of this image.

2. Description of the Related Art

To overcome these drawbacks, instead of having recourse to delicate manual adjustments, it has been proposed to make use of a negative feedback loop. This negative feedback loop uses an image retaking device to detect and then automatically correct certain of these faults. This fault detection method is based on a sequential analysis of reference pixels equidistributed on a projected test image. A processing of this type cannot be used to analyze the variations due to instances of non-uniformity in an entire image, for example non-uniformity of brilliance or colorimetry, but can be used only to analyze variations in shape, notably variations in geometry, convergence or focusing. Moreover the variations due to the temporal drift of the localization of the pixel, for example resulting from thermal drifts affecting the characteristics of the projection tubes, cannot be corrected without adding on a complex self-correlation processing operation. This means that such a system cannot be used to make a full correction of the entire projected image. In particular, it is not possible to make a correction of uniformity of brilliance or a correction of colorimetry.

SUMMARY OF THE INVENTION

The object of the invention is a device for the detection and correction of all the faults of a projected image that also uses a negative feedback for the measurement and correction of the faults, but wherein the image retaking device enables the complete retaking of a test image, only once or by zones. The analysis of the retaken, projected test image can then be used to determine the corrections to be made and adapted circuits apply the corresponding corrections to the control circuits of the projection tubes.

To achieve this result, the present invention proposes a projection display device with a negative feedback loop for the detection and correction of all the faults of the projected image wherein said loop comprises a test chart generating means, coupling means to project either the test chart or the useful image, means to retake the entire projected image, means for the measurement and analysis of the retaken image including means for the comparison of the test image and the retaken image associated with a processor for the computation of correction signals to be applied to the control circuits defining the projection characteristics.

BRIEF DESCRIPTION OF THE DRAWINGS

Other features and advantages of the present invention will appear from the following detailed description, given as a non-restrictive example and made with reference to the appended drawings of which respectively:

FIG. 1 is a diagram illustrating the principle of the invention;

FIG. 2 shows means for the correction of geometrical and convergence faults;

FIGS. 3a and 3b are graphs illustrating an example of faults of geometric distortion on elements of the first test chart;

FIG. 4 shows the dynamic focusing correction means;

FIG. 5 is a drawing of a pattern of a second reference test chart used for the dynamic focusing correction;

FIGS. 6a and 6b are graphs bringing out the dynamic focusing faults;

FIGS. 7 and 8 show possible variations in the real-time follow-up of the corrections to be made.

DESCRIPTION OF THE PREFERRED EMBODIMENTS

FIG. 1 illustrates the principle of the invention applied to a video projector including: a projection screen 1, three projection tubes 2R, 2G, 2B for the red, the green and the blue (R, G, B), respectively associated with three optic projection systems symbolized by the lenses 7R, 7G, 7B. In a device such as this, each component R, G, B of the useful video signal is amplified on each corresponding channel 1R, 1G, 1B, by means of a variable gain amplifier (VGA), respectively 3R, 3G and 3B, then go into the input of each tube. Digital control circuits 5 include horizontal and vertical scanning control circuits by the application of sawtooth currents in the deflection coils of the electron beams 4R, 4G, 4B, a dynamic focusing control circuit that applies voltages to the corresponding coils 5R, 5G, 5B, and circuits to modulate each variable gain amplifier (VGA).

The invention consists in the addition, to this projection system, of a negative feedback loop retaking an entire image which, by the analysis of the projected test chart or of overlaid markers, will enable the introduction of correction values into all the control circuits cited, in order to obtain a totally corrected image.

According to the invention, the device includes, to this effect, a test chart generator 6 provided with a time base to control the line and frame synchronizations, slow multiplexers SM, respectively 8R, 8G, 8B, on each video channel to couple either the component R, G or B of the video signal to a first input or the signals coming from the test chart generator 6 to a second input, a video camera 3 for the complete retaking of the projected image and an analysis device 4 receiving, firstly, the signals coming from the camera 3 and, secondly, those coming from the test chart generator 6.

During a preliminary setting, the multiplexers transmit the test signals coming from the test chart generator 6 to the projection tubes, the video camera carries out the total retaking of the image of the test chart projected on the screen 1 and the analysis device 4 makes a measurement, by means of a comparator 41, of the time differences or amplitude differences between the signals coming respectively from the camera 3 and the test chart generator 6. From these differences, the device 4, using the processor 42 and the memory 43, computes and memorizes a set of signals of corrections to be made to the spatial, colorimetric and brilliance characteristic of the image projected by means of the control circuits 5. The information 4 also includes initialization information designed initially to correct the faults proper to the camera and its optic system, so much so that the errors measured can be imputed only to the projection tubes and projection optic systems.

Should the camera have a weaker resolution than that of the image to be analyzed, the projected image is cut up into several zones that the camera analyzes sequentially. Each zone is referenced by placing a marker (for example the center of the zone) at the center of the image delivered by the camera, through an aiming system 10 constituted by a micro-control panel.

In a first phase, the device according to the invention initializes the correction values to be provided and then, in a second phase, continues the assessment of these values in real time.

It would be appropriate to begin with a more precise description of the means adapted to the correction of each of the faults observed.

With respect to the correction of geometry, the negative feedback loop has, as its control circuits, and referring to FIG. 3, horizontal and vertical scanning control circuits 51 having main digital scanning control circuits 52 common to the three channels and additional digital scanning control circuits 53 for each channel. The a priori knowledge of the relationship of geometrical distortion (for example in pincushion form) enables the predistortion of the main scanning, while the fine corrections are confined to the additional scanning circuits.

The mode of operation governing the device according to the invention applied to the correction of the geometrical distortions, which is known per se, is the following: a video signal representing a geometry correction signal is applied to the input of the green projection tube used as a reference: this standard test chart, referenced 61 in FIG. 2, consists of successive lines of diamonds and rectangles. The diamonds are alternately inclined from one line to the next one.

The errors due to geometrical distortions of the green channel are assessed at the comparator of the analysis device as illustrated by FIGS. 3a and 3b which represent a diamond and a rectangle of the test chart, respectively in solid lines for the reference test chart and in dashes for the projected and retaken test chart, as well as the corresponding detected signals. The geometric figures are assumed to be at the maximum luminance on a black background. The temporal differences between the front transitions and between the rear transitions of the signals ($\Delta t$ and $\Delta t'$ in FIG. 3a) are measured for a same geometric pattern, these transitions corresponding to a variation in luminance and the mean between the temporal difference corresponding to the front transitions and the temporal difference corresponding to the rear transitions of each geometrical pattern is attributed to the barycenter of the corresponding geometric pattern. The values thus measured should be corrected by the test chart transit, image generation and image retake time which causes a temporal shift. From these values given by the comparator 41, the processor 42 computes the correction signals to be provided in order to correct the errors of positioning of the barycenters.

Other correction signals are obtained from an interpolation polynomial to form a complete set of correction signals: after synchronization and by means of the memory 43, these signals are transmitted to the additional digital scanning control circuits 53 of each channel R, G, B before being summed up by adders S 6R, 6G and 6B, to the signals defined by the main scanning control circuit 52 to give the spatial characteristics of projection: after conversion into analog form by means of digital/analog converters D/A (9R, 9G, 9B), the output signals of the adders define the corrected voltages applied t the horizontal and vertical scanning coils. For the red and blue channels, the differential corrections of geometric distortion will be done with the convergence corrections so that similar processing operations will not have to be reiterated.

The convergence faults arise out of the fact that the three images formed by the three beams, namely the red, green and blue beams, are not superimposed. The previously used electronic test chart is applied simultaneously to the input of the green and red channels. The temporal differences between the test charts projected by the red and green tubes are measured by the analysis device after the retaking of the image by the camera, the green tube serving as a reference. The same processing operation as the one carried out during the correction of geometric distortion makes it possible to deduce the values of the additional correction coefficients to be applied to the additional control circuits for the scanning of the red tube. The same operation should be conducted again in the blue and green tubes in order to obtain a superimposition of the three images projected by the three tubes.

For the correction of dynamic focusing and astigmatism, the focusing is optimized as a function of the position of a considered image zone, for each projection tube. To this end, a second electronic test chart, such as the one illustrated by the FIGS. 4 and 5, is projected successively by each of the tubes: this test chart referenced 62 in FIG. 4 has superimposed arrowhead patterns, each arrowhead having a left oblique wing (LOW) and a right oblique wing (ROW). When the focusing and the astigmatism of the spot are accurate throughout the tube, the image retaking camera delivers a signal for which the modulation rates, shown in FIG. 6a, are equal for the two wings LOW and ROW. When the focusing and astigmatism are not optimalized (with the spot in an ellipse with variable axis as shown in dashes in FIG. 5), the rates of modulation for the wings LOW and ROW are not equal and, at the output of the projected test chart retaking camera, the signal shown in FIG. 6b is obtained. To optimize the focusing, the following procedure, described with reference to FIG. 4, is carried out: the analysis device 4 measures the differences in amplitude of the rates of modulation of the signals and computes the corrections to be made so that the rates of modulation LOW and ROW are equal for each of the patterns of the test chart, the focusing being thus optimized on the entire image. The correction values are added, by mans of an adder S 8, to the focusing control value coming from the control circuit 7. The values thus corrected are applied to a digital-/analog converter D/A 9 which delivers the analog focusing control signal to the projection tubes 2R, 2G, 2B.

The corrections of colorimetry and of uniformity of brilliance are implemented, with reference to FIG. 1, by the setting of the variable gain amplifiers (VGAs) associated with each tube. For the correction of colorimetry, a signal R, G or B corresponding to the reference level of the white is projected sequentially, on the three projection tubes. The device 4 then uses the camera 3 to measure the return video signal and to compare it with the amplitude of the initial video signal. The gain of each of the channels is then adjusted so as to obtain a white level corresponding to the desired color temperature.

To achieve uniformity of brilliance, the signal associated with the test chart used for the geometrical and convergence distortions is transmitted to the three channels. This test chart contains the geometrical forms shown in FIG. 2 which have different degrees of brilliance in the case of non-uniformity of the brilliance of the image. The comparative analysis of the brilliance levels of the shapes, carried out by the analysis device 4, enable the definition of the values to be applied to the three variable gain amplifiers VGAs so as to obtain a uniformity of the white levels. The set of values to be applied is complemented by interpolation, for the points that do not belong to the patterns analyzed, using results corresponding to the different measurement patterns.

When this preliminary correction stage is completed, then the video projection can start. The device according to the invention enables the real-time follow-up of all the automatic corrections obtained in the initialization stage so as to get rid of thermal drifts if necessary. To do this, temporal differences are measured for a certain number of points of the projected video images without hampering the perception thereof. Three technical approaches implementing the device of the invention shall be described.

The first approach, illustrated in FIG. 7, uses the same means as those described with reference to FIG. 1, in substituting fast multiplexers FM for the previous slow multiplexers SM. As shown in FIG. 7 these fast multiplexers FM will overlay markers corresponding to a white dot on a first channel and correspond to a black dot N on the other two channels for a given image dot or element. Then, the chosen allocation (black, white) is permutated sequentially in order to successively test each tube. This operation is carried out again on a set of dots of the image with a fairly slow recurrence so as not to cause visual persistence. By means of the camera-aiming device 10 and an enlargement to identify the overlays, the spatial differences between the positions of the overlaid white dots and their theoretical positions are measured by the analysis device 4. This device computes the adapted correction values to be applied to the different control circuits as during the preliminary correction phase (except for the correction of focusing).

The second approach, illustrated in FIG. 8, relies on a different form of implementation: the frame 14 of the projection tube corresponding to the image format envisaged, for example a 16×9 HDTV format, defines two zones, a first zone 11 located within this frame and a second zone 12 surrounding the exterior of the frame 14. Inside the first zone, the projection tube is provided with a phosphor emitting in the visible range and, outside this zone 11, with a phosphor emitting a non-visible, near infrared or ultraviolet radiation.

A slight overscanning of the tube is done on the zone limited by the dashed line 13 without its being possible to perceive this excitation. The dots corresponding to the green tube, and then the red and, finally, the blue tubes are activated sequentially, and the temporal differences existing between the different dots emanating from the different tubes are measured, the camera representing an image enlarged with respect to the useful image and preserving a certain sensitivity to the near infrared or ultra-violet radiation. Using these values of temporal differences, the same elaboration of the correction coefficients is made as in the preliminary correction phase.

A variant of this implementation (not shown) consists in the overlaying of the patterns of phosphor emitting in the near infrared or ultraviolet in the screen of the projection tubes. The spatial identification of the dots used as a base for the measurements of the temporal differences is then done within the useful zone.

The invention is not restricted to the embodiments that have been specifically described and shown. In particular, the correction means used may be different from those described without going beyond the scope of the invention. Furthermore, the use of a video camera having a resolution that is as high as the projected image in order to retake the projected image in only one go, thus making it possible to remove the need for the aiming device for a zonewise image acquisition, or the application of the invention to other display devices (retro-projection, beam-index tube etc.) is within the scope of those skilled in the art.

What is claimed is:

1. A video projection display device for projecting video images on a screen for detecting and correcting faults in the projected video images, comprising:

test chart signal generating means for generating at least one test chart signal to be projected on the screen;

projecting means for projecting either the at least one test chart signal or a useful image on the screen, the projecting means comprising at least three projection tubes respectively associated with three color video channels to be superimposed, one of the three color video channels being a reference channel;

video camera means for retaking the test chart and video images projected on the screen;

computing means for measuring and analyzing images retaken by the video camera means, including comparing means for comparing temporal and amplitude differences between transitions of image signals between the at least one test chart projected on the screen and retaken by the video camera and the test chart signal generated by the test chart generating means, wherein the computing means calculates correction signals to be applied to the projecting means to correct faults in the projected video images.

2. The video projection display device according to claim 1, including correcting faults of geometrical distortions, wherein the test chart generating means generates at least a first test chart signal formed of predetermined geometrical patterns;

the projection means further comprising:

control means including horizontal and vertical digital scanning control means common to the three color video channels for receiving the correction signals from the computing means;

adder means for adding up digital values of spatial characteristics of projection; and digital/analog converter means for applying the correction signals to the horizontal and vertical scanning control means of the three color video channels to compensate for faults of geometrical distortions.

3. The video projection device according to claim 2, wherein the temporal differences are measured between front transitions and between rear transitions of the predetermined geometrical patterns in the retaken test chart image and the test chart signal generated by test chart generating means, wherein a mean between the temporal difference in the front transitions and the temporal difference in the rear transitions of the predetermined geometrical patterns is attributed to a barycenter of the corresponding predetermined geometrical patterns of the test chart, and wherein the computing means calculates the correction signals relating to positioning of said barycenters as well as intermediate correction signals based on an interpolation polynomial to form a complete set of correction signals to be input to the projecting means.

4. The video projection device according to claim 1, including correcting faults of convergence, wherein the at least one test chart signal is applied simultaneously to the reference channel and a second channel, and is then applied simultaneously to the reference channel and a third channel, and wherein the correction signals computed by the computing means are applied successively to the projection tube associated with the second channel, and then to the projection tube associated with the third channel.

5. The video projection device according to claim 1, including correcting faults of dynamic focusing, wherein the test chart signal is formed of predetermined patterns and is applied successively to each of the three projection tubes, wherein the calculating means measures differences in amplitude of rates of modulation for each predetermined pattern of the test chart signal and computes the correction signals to equalize the modulation rates relating to each of the predetermined patterns, and further comprising a focusing control circuit for receiving the correction signals output from the computing means, and a digital/analog converter for receiving the correction signals from the focusing control circuit and converting the correction signals to analog signals to deliver analog focusing control signals to the three projection tubes.

6. The video projection device according to claim 1, including correcting faults of colorimetry, wherein a signal corresponding to a reference white level is output from the three projection tubes and projected on the screen, wherein the computing means measures differences in amplitude between the projected image signals retaken with the video camera and the reference signals successively output to the three projection tubes, and wherein the correction signals output from the computing means are applied to control circuits of variable gain amplifiers to achieve a desired color temperature.

7. The video projection device according to claim 2, including correcting uniformity of brilliance, wherein the signal of the first test chart is applied to the three video channels, wherein a difference in brilliance of the predetermined geometrical patterns of the first test chart is measured by the computing means and the computing means outputs correction signals which are completed by interpolation and are transmitted to the control means which further comprises variable gain amplifiers.

8. The video projection device according to claim 1, including real-time follow-up of the fault corrections, wherein white markers on the reference channel and black markers on the other channels are overlaid in the projected image by coupling means of fast multiplexers, wherein the video camera operates by zones with an enlargement sufficient to identify the white overlays, wherein the temporal differences between the signals corresponding to real and theoretical positions of the overlays are measured by the computing means, and wherein the values for correction of geometry, convergence, colorimetry and uniformity of brilliance are computed by the computing means and applied to the corresponding projecting means.

9. The video projection device according to claim 1, including real-time tracking of corrections, wherein the projection tubes are provided with a phosphor emitting in a visible range inside a first useful zone and a phosphor emitting in a near infrared or ultraviolet range in a second zone surrounding the first zone, wherein a slight overscanning in an intermediate zone limited by a contour is carried out, wherein the scanning spot excites the phosphor bordering the first useful zone, and wherein the temporal differences are measured for points located outside the first useful zone.

10. A device according to claim 9, wherein the phosphor emitting in the near infrared or ultraviolet is overlaid in the form of markers in the first useful zone.

* * * * *